US011314947B2

(12) United States Patent
Katariya et al.

(10) Patent No.: US 11,314,947 B2
(45) Date of Patent: Apr. 26, 2022

(54) AUTOMATION OF DOCUMENT GENERATION FROM INDEPENDENT STRUCTURED AND UNSTRUCTURED DATA SOURCES

(71) Applicant: JPMORGAN CHASE BANK, N.A., New York, NY (US)

(72) Inventors: Jasdeep K. Katariya, Houston, TX (US); Suresh Devanahally, Monroe Township, NJ (US); Priyank Hariawala, Houston, TX (US); Kinnari Patwa, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 327 days.

(21) Appl. No.: 16/555,410

(22) Filed: Aug. 29, 2019

(65) Prior Publication Data

US 2021/0064707 A1 Mar. 4, 2021

(51) Int. Cl.

| | |
|---|---|
| ***G06F 40/10*** | (2020.01) |
| ***G06F 40/56*** | (2020.01) |
| ***G06F 16/35*** | (2019.01) |
| ***G06K 9/00*** | (2022.01) |
| ***G06F 40/14*** | (2020.01) |
| ***G06F 40/49*** | (2020.01) |
| ***G06F 40/117*** | (2020.01) |

(52) U.S. Cl.
CPC .............. *G06F 40/56* (2020.01); *G06F 16/35* (2019.01); *G06F 40/117* (2020.01); *G06F 40/14* (2020.01); *G06F 40/49* (2020.01); *G06K 9/00469* (2013.01)

(58) Field of Classification Search
CPC ...... G06F 16/335; G06F 16/95; G06F 40/166; G06F 9/451; G06F 16/30; G06F 40/186; G06F 16/35; G06F 40/205; G06F 40/49; Y10S 707/951; Y10S 707/99948; Y10S 715/968
See application file for complete search history.

(56) References Cited

U.S. PATENT DOCUMENTS

2004/0168133 A1* 8/2004 Wynn .................. G06Q 10/109 715/255
2007/0233524 A1* 10/2007 Alban ....................... A61F 2/95 705/3
2013/0305149 A1* 11/2013 Dimitrov ................ G06F 16/93 715/273
2014/0095990 A1* 4/2014 Blanchard ............ G06F 40/186 715/255

(Continued)

*Primary Examiner* — Olujimi A Adesanya
(74) *Attorney, Agent, or Firm* — Hunton Andrews Kurth LLP

(57) ABSTRACT

Exemplary embodiments automate the production of memos in support of the due diligence process for underwriting. Target users may include investment bankers, financial analysts, and the like. The data collection process of supporting data for the memo may be automated thus improving efficiency in the creation of the due diligence memo. Both the collected data and memos may be stored in a database, enabling access at a later date and enabling the collected data from one memo, as well as other information from the memo, to be used for future memos. The data collection may be conducted from both structured and unstructured sources. The sources may be both internal and external sources. The external sources may be public data sources.

13 Claims, 15 Drawing Sheets

(56) References Cited

U.S. PATENT DOCUMENTS

| | | | | |
|---|---|---|---|---|
| 2014/0173401 | A1* | 6/2014 | Oshlag | G06F 40/18<br>715/212 |
| 2015/0205517 | A1* | 7/2015 | Feng | G06K 9/00402<br>715/268 |
| 2020/0303048 | A1* | 9/2020 | Petri | G06F 40/47 |

* cited by examiner

Create a New Memo     X

700

| | |
|---|---|
| Select the Deal: — 702 | TRAINING567 ▽ |
| Select the Memo: — 704 | NA DUCC ▽ |
| Client: — 706 | COMPANY X |
| Change Factset Mapping: — 708 | COMPANY X 🔍 |
| Factual Entity Id: — 710 | 0FQD05-E |

Cancel     Create Memo — 712

Client Lookup

SEARCH FOR [Company X] _802_  [Find More Clients] [Clear] (?)

Found 1 Clients for Step 5 of 10: Searched CMP's and their children (IB only) (begins)    IB CMP (Client Management Parent)

| CLIENT NAME | CAS ID | PARENT CAS ID | PARENT NAME | INDUSTRY | TYPE | COUNTRY | LOB | CLIENT EXECUTIVE | SHORT NAME | UCN | ECID |
|---|---|---|---|---|---|---|---|---|---|---|---|
| COMPANY X | 9705057408 | | | FOOD PRODUCTION COMPANIES | IB Child | UNITED STATES | IB | | | 022619878000 | 9705057408 |

_804_

1 - 1 of 1 items

_800_

| 900 |
|---|
| 1. Transaction Summary |
| 2. Issuer/Sponsor/Company background |
| 3. Financial Institution overall relationship and transaction history |
| 4. Internal credit and other information |
| 5. Issuer Financials |
| 6. Risk factors from prospectus, most recent SEC filing or draft offering circular (do not summarize or paraphrase) |
| 7. Diligence meetings to date |
| 8. Diligence questions |
| 9. Research |
| 10. High grade bond mandate notification |

902

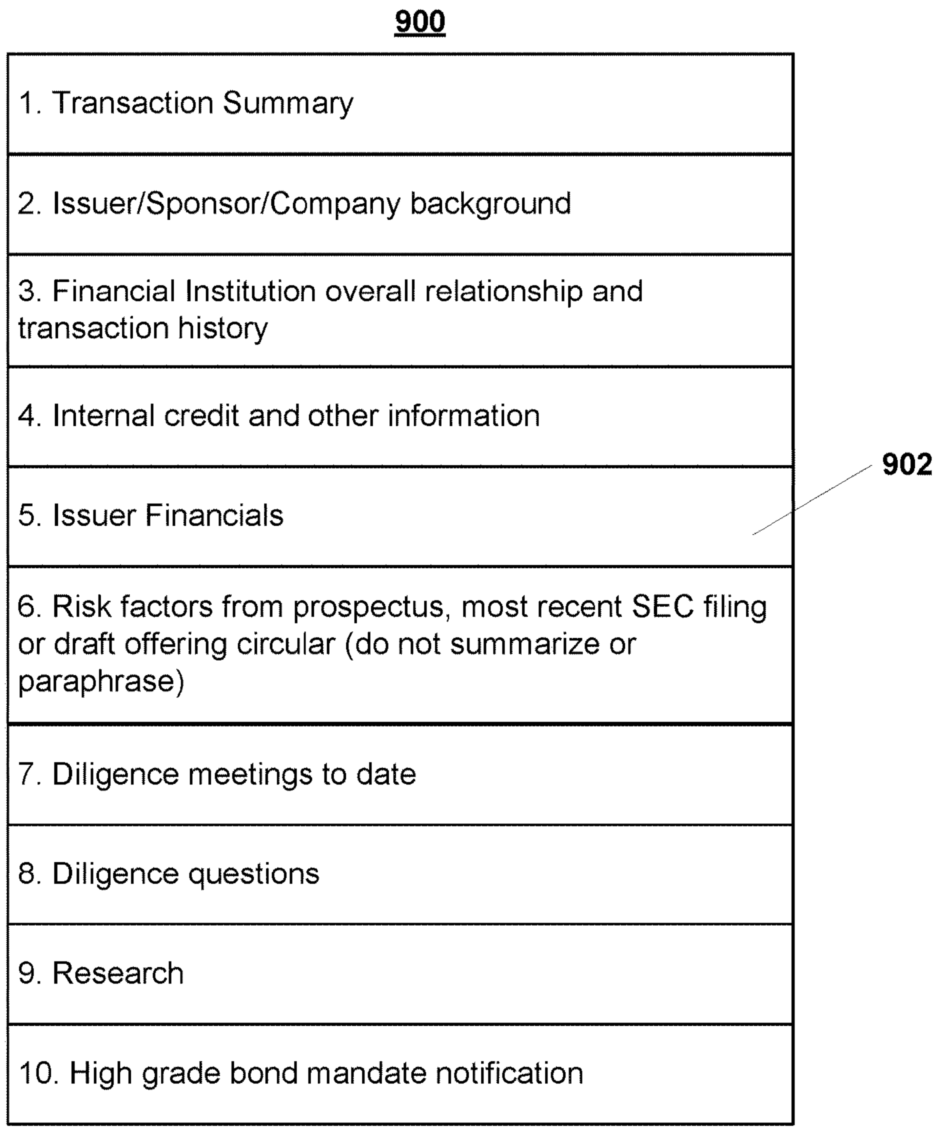

| |
|---|
| 1. Transaction Summary |
| 2. Key considerations for commitments committee |
| 3. Financial Institution overall relationship and transaction history |
| 4. Internal credit and other information |
| 5. Business Description |
| 6. Risk factors from prospectus, most recent SEC filing or draft offering circular (do not summarize or paraphrase) |
| 7. Key Selling Points |
| 8. Historical fiscal and interim financials; most recent cap table |
| 9. Valuation Section |
| 10. Stock price performance |
| 11. Sizing matrix |
| 12. Management and director biographies |
| 13. Diligence meetings to date |
| 14. Diligence questions |
| 15. Top 30 Shareholders |
| 16. Summary of sell-side research price targets and recommendations |

Select Relevant Sections

- ☑ RISK FACTORS — 1052
- ☐ DOCUMENTS INCORPORATED BY REFERENCE
- ☐ GENERAL DESCRIPTION OF THE PROGRAMME
- ☐ TERMS AND CONDITIONS OF THE NOTES
- ☐ OVERVIEW OF PROVISIONS RELATING TO THE NOTES CLEARED THROUGH COMPANY A OR COMPANY B WHILE IN GLOBAL FORM
- ☐ BOOK ENTRY NOTES HELD THROUGH COMPANY C
- ☐ USE OF PROCEEDS
- ☐ DESCRIPTION OF COMPANY D
- ☐ DESCRIPTION OF COMPANY E, FRANCE BRANCH
- ☐ TAXATION
- ☐ CLEARING AND SETTLEMENT
- ☐ SUBSCRIPTION AND SALE
- ☐ TRANSFER RESTRICTIONS
- ☐ FORM OF FINAL TERMS
- ☐ GENERAL INFORMATION
- ☐ ANNEX – ALTERNATIVE PERFORMANCE MEASURES

[Import Sections] — 1054
[Import Entire Document] — 1056

1050

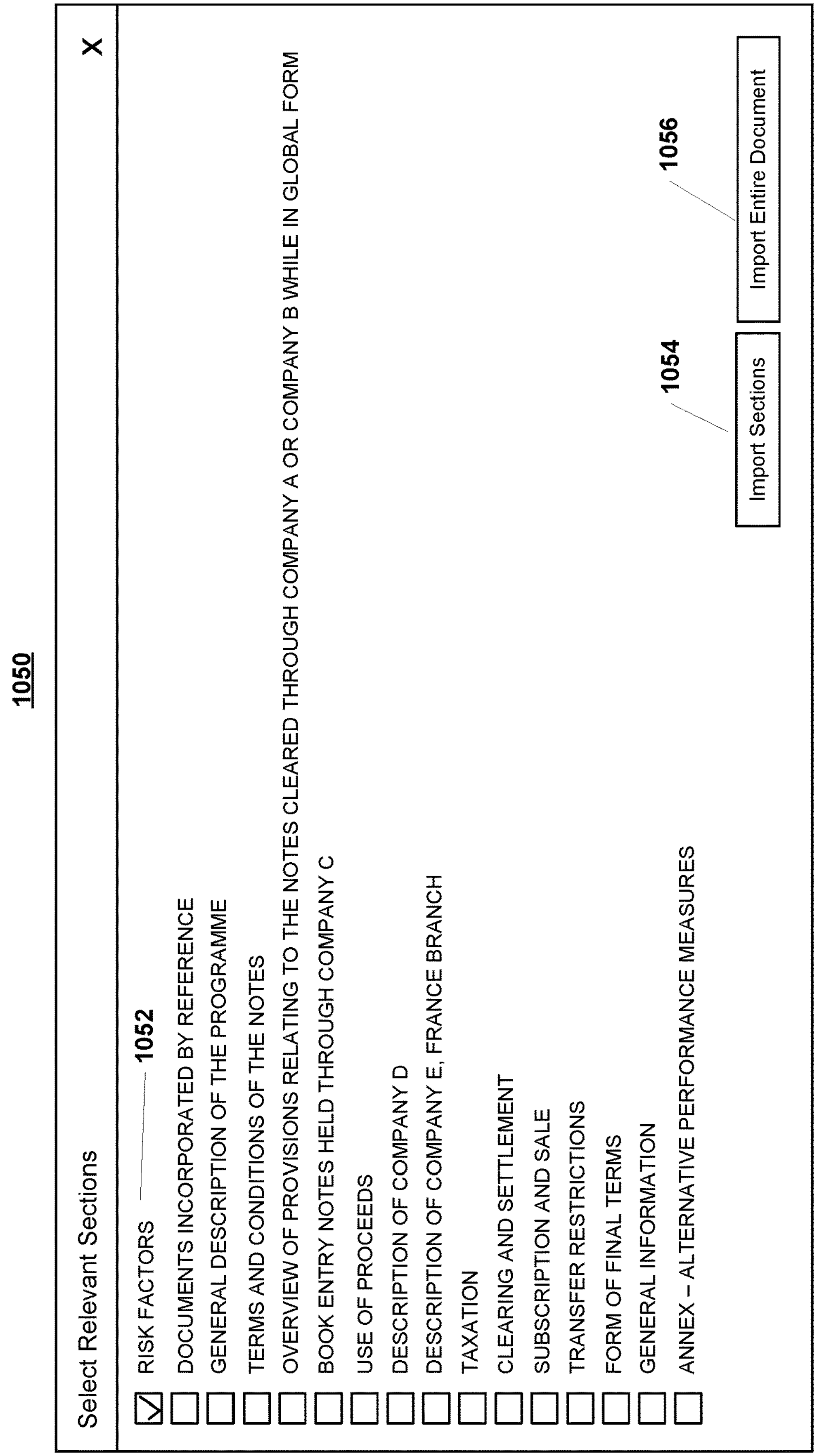

Home | Export

EMEA Equity – FO: AAAA – COMPANY A | Manage Memo Details

| | |
|---|---|
| 1. Transaction Summary | **13. Diligence meetings to date** |
| 2. Key considerations for commitments committee | Ensuring that we record all of the diligence meetings which occurred as part of this transaction and accurately reflect the attendees at that meeting is a crucial piece of our due diligence process. With the time this tool will save you in formatting your meeting tables, please confirm that the people listed for each meeting accurately reflects those actually in attendance. |
| 3. Financial Institution overall relationship and transaction history | |
| 4. Internal credit and other information | Edit Attendee Details \| Create Meeting Table \| iMeet Refresh |
| 5. Business Description ⊘ | 1204 |
| 6. Risk factors from prospectus, most recent SEC filing or draft offering circular (do not summarize or paraphrase) | |
| 7. Key Selling Points | |
| 8. Historical fiscal and interim financials; most recent cap table | |
| 9. Valuation Section | |
| 10. Stock price performance ⊘ | |
| 11. Sizing matrix ⊘ | |
| 12. Management and director biographies | |
| 13. Diligence meetings to date | |
| 14. Diligence questions | |
| 15. Top 30 Shareholders | |
| 16. Summary of sell-side research price targets and recommendations | |

Financial Institution diligence events (including Business, Legal, and Accounting)

| Date | Event | Financial Institution Attendees / Titles | Other Attendees / Titles | |
|---|---|---|---|---|
| 03/27/2018 | Recurring ComCom Planning Discussions | John Doe, Executive Director<br>John Doe, Vice President | 1206 | Edit |
| 03/27/2018 | | | | Edit |
| 09/01/2017 | | Jane Doe, Analyst | | Edit |
| 1202 | | | Company D<br>Company E<br>Company F | |
| 08/24/2017 | Copy: Financial Institution | | Company G | Edit |
| 06/27/2017 | Copy: Company A | John Doe, Managing Director | Company G | Edit |
| 06/07/2017 | Copy: Company B | | Company H | Edit |
| 03/20/2017 | Copy: Company C | | | Edit |

Showing 13 Diligence Meetings

⊕ 75% | Finalize

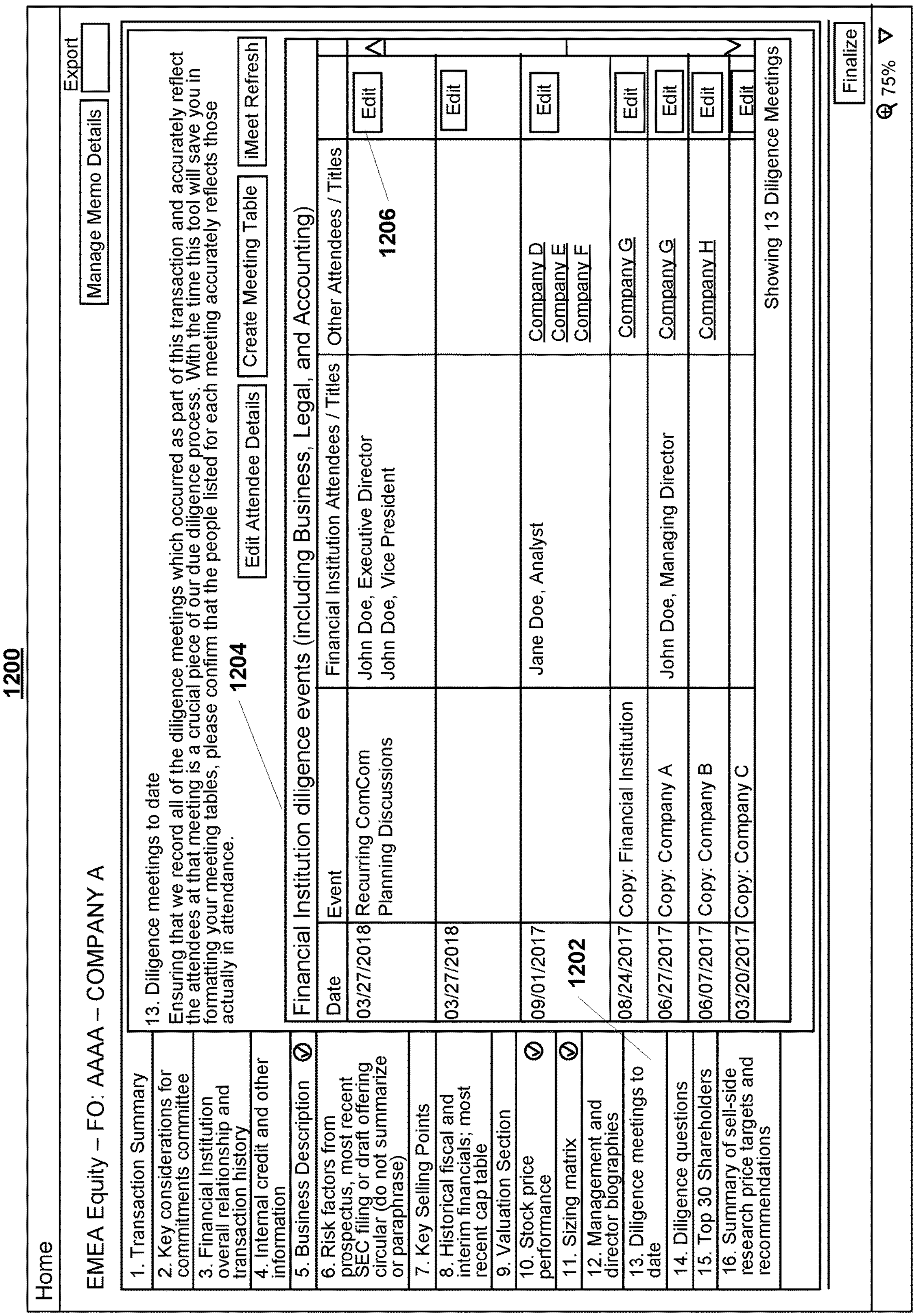

FIG. 12

AUTOMATION OF DOCUMENT GENERATION FROM INDEPENDENT STRUCTURED AND UNSTRUCTURED DATA SOURCES

FIELD OF THE INVENTION

Exemplary embodiments generally relate to a system that may provide end-to-end digitization, automation, and collaboration. Specifically, exemplary embodiments provide for the automated creation of memos in support of due diligence efforts, such as those undertaken by financial institutions and the like as part of deals and underwriting. Exemplary embodiments further include features that provide for scraping of data from both structured and unstructured sources as well as provide for editing of the various sections of the memo in a word processing format.

BACKGROUND

Underwriting due diligence protects organizations, such as financial institutions, from reputational and legal risks. It also enhances the quality of service of security offerings to investors. During difficult economic conditions, it can be especially important to ensure the adequacy of such due diligence investigations as well as the accuracy and completeness of disclosures.

For example, investment bankers are typically required to seek approval from an underwriting committee before proceeding with any equity or debt transaction. Accordingly, they spend numerous hours, typically upwards of 20 hours manually assembling a document by reviewing and collating information from various internal systems and publicly available data sources to capture transaction details, credit information, diligence meetings, risk factors, business description of the client, institution relationship history with the client, previous transactions, shareholders, management, etc.

As noted above, one aspect of the due diligence process is tracking the details of all of the meetings with a variety of entities such as the client, law firms, and auditors during both the course of the deal and the relationship with the client over the past two years. In order to accomplish this tracking, users must keep a running Excel spreadsheet during the course of the deal where they would document the attendees, date, and topic discussed, or they would ask an executive assistant to send all of the calendar files for every meeting based on this deal and then they would manually transcribe all of those details by hand into the meeting table. This results in a manually intensive process.

These and other drawbacks exist.

SUMMARY OF EXEMPLARY EMBODIMENTS

Exemplary embodiments include a system having a memory device; a processor communicatively coupled to the memory device and executing instructions including: receiving an input for creation of a new memo such that the input comprises a memo type and a target entity; creating a new memo template based on the input for creation of the new memo wherein the new memo has a plurality of sections; accessing one or more unstructured data sources; retrieving data from the one or more unstructured data sources; formatting the data retrieved from the one or more unstructured data sources; inserting the formatted data into one or more section of the new memo; retrieving data from one or more structured data sources; inserting the data from the one or more structured data sources; receiving a selection of a section from the plurality of sections; providing access to a word processing interface to edit the selection of the section; retrieving data from one or more sources and populate one or more sections of the plurality of sections; and importing meeting information into at least one section of the plurality of sections.

These and other advantages will be described more fully in the following detailed description.

BRIEF DESCRIPTION OF THE DRAWINGS

In order to facilitate a fuller understanding of the present invention, reference is made to the attached drawings. The drawings should not be construed as limiting the present invention, but are intended only to illustrate different aspects and embodiments of the invention.

FIG. 9A depicts a menu of memo sections according to an exemplary embodiment.

FIG. 9B depicts a second menu of memo sections according to an exemplary embodiment.

FIG. 10B depicts an interface for selecting portions of a file to import according to an exemplary embodiment.

FIG. 12 depicts an event table according to an exemplary embodiment.

DETAILED DESCRIPTION

Figure 1:
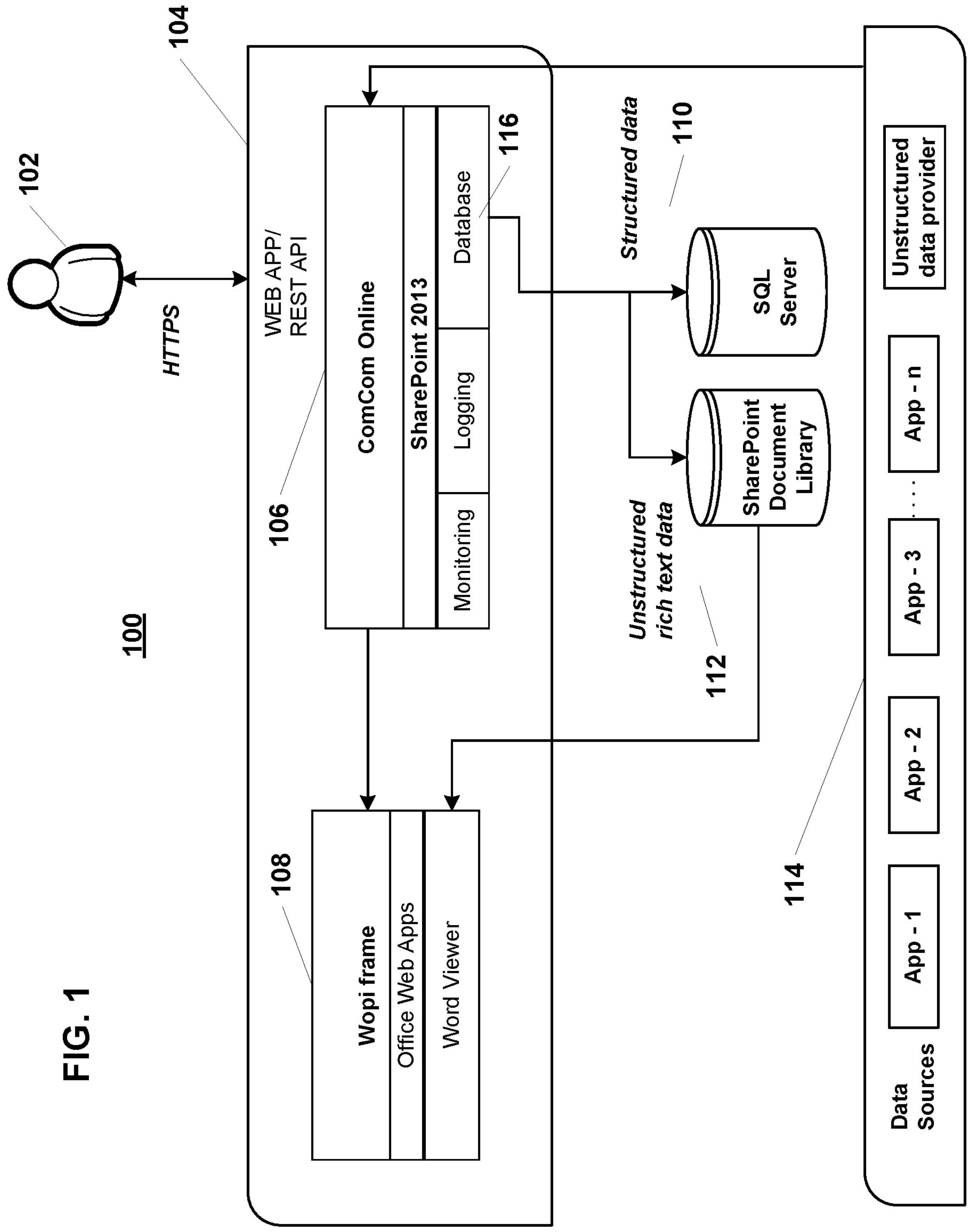
FIG. 1 depicts an architecture according to an exemplary embodiment.

The following description is intended to convey an understanding of exemplary embodiments by providing specific embodiments and details. It is understood, however, that various embodiments are not limited to these specific embodiments and details, which are exemplary only. It is further understood that one possessing ordinary skill in the art, in light of known systems and methods, would appreciate the use of various embodiments for its intended purposes and benefits in any number of alternative embodiments, depending upon specific design and other needs.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the various embodiments. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

As used herein, “internal sources” refers to sources that are within an organization.

As used herein, “organization” may refer to a financial institution that includes institutions that provide financial services to their members or customers. These institutions may include, but are not limited to banks, credit unions, trust companies, mortgage loan companies, insurance companies, investment banks, underwriters, and brokerage firms. The use of the term “financial institution” herein is meant to be exemplary and non-limiting.

Exemplary embodiments include an online system that may provide end to end digitization, automation and collaboration. Exemplary embodiments may be referred to as “ComCom” which is a shorthand for “Commitments Committee.” This name is meant to be exemplary and non-limiting. The system may be accessed through a web-based interface such as through a web browser. In other embodiments, the system may be accessed through an application.

Exemplary embodiments automate the production of memos in support of the due diligence process for underwriting. According to exemplary embodiments, target users may include investment bankers, financial analysts, and the like. The data collection process of supporting data for the memo may be automated thus improving efficiency in the creation of the due diligence memo. Both the collected data and memos may be stored in a database, enabling access at a later date and enabling the collected data from one memo, as well as other information from the memo, to be used for future memos. The data collection may be conducted from both structured and unstructured sources. The sources may be both internal and external sources. The external sources may be public data sources.

In exemplary embodiments, the memo may include a combination of sections having information and data pulled from regulatory documents, deal-related documents, calendar invitations, models, and general knowledge of involved individuals. The memo may include various sections, such as, but not limited to, transaction summary, internal credit, risk factors, due diligence meetings, and client relationship and transaction history. Different underwriting efforts may require different memo formats. The different memo types, and their content, may be defined by the organization for which the memo is being produced. The system may have a series of templates for a variety of different memo types.

This system can automatically scrape content from public sources and filings (e.g., Securities and Exchange Commission (SEC) filings such as 10-K and 10-Q filings) and can connect to external content sources to automatically capture a variety of data (e.g., the top 30 shareholders, management and director biographies, stock chart, etc.). The scraped data and captured data can be automatically put into the memo format in desired sections. The data may be formatted by the system prior to dropping into the memo. Further, data can be uploaded from files to the memo. The files can be uploaded whole or in part based on selections by a user. For example, a user may be able to select while sections of a file are input into the memo. A user may be provided options for editing of the data in the memo.

According to exemplary embodiments, the system may further provide text editing capabilities. The text editing capabilities may be in the form of an interface with a word processing program. For example, the system may interface with Word. For editing sections of the memo, the section may be pulled into a word processing program and then returned to the system of exemplary embodiments once the editing is complete.

According to exemplary embodiments, the system may connect to internal deal management and transaction pipeline systems to source any information that might already be available and allows for the capture of all due diligence meetings and attendees by seamlessly integrating with mail systems (e.g., Outlook) to drag and drop meetings into the system. The system may automatically pull in meeting information from previous deals that are related.

Exemplary embodiments may further enforce unified branding and allows users to export the digitized data to a processor (e.g., as a Word document or similar suitable format). Automation may be improved up to 100% by tapping into other external/internal sources of information for a deal and client.

The system according to exemplary embodiment may be configured to gather unstructured data, such as from public sources, as well as structured data from internal sources. The structured data is so-called because it is formatted and structured in a consistent manner and in accordance with the entity’s guidelines. Unstructured data is data outside of this structure. The unstructured data may indeed have its own structure and organization.

The system may then format the data, brand it, insert it into the correct template, and present it to the user. The user can review the data and edit the data as required. The data may be stored in a database.

The branding of the data may be optional. It should be appreciated that many organizations require the use of standardized formats for documents, presentations, etc. These standardized formats may include particular logos, colors, formats, etc. that are unique to the organization and may be used to provide recognition that a product is from the organization.

In exemplary embodiments, a memo dashboard may provide a central point of access to the system of exemplary embodiments. The dashboard may display a listing of memos in progress as well as a listing of the previous memos produced with exemplary embodiments as well as the status of those previous memos. Each of the previous memos may be accessed and reviewed, and edited if required. The memo dashboard may allow for creation of new memo. Further, data and information from each of the previous memos may be copied and pasted into a new memo. In some embodiments, the data from previous memos may be automatically copied by the system into the appropriate sections of a new memo that is on a related topic or relates to the same entity.

Exemplary embodiments include an automated external data feed that allows for locating the current entity to pull data for. Once the desired entity is selected, a formatted memo screen appears. Further, different types of memos can be selected and the various sections are then revealed and selectable. Once a memo type is selected and the entity defined, data from previous submissions can be automatically included in the new memo, including diligence meetings conducted within the previous two years.

Calendar files can be directly uploaded. For example, files from a mail program, such as Outlook, can be uploaded (e.g., .ics files). Exemplary embodiments may include a meeting table builder. This feature automates a previously manual process of documenting meetings relating to the due diligence and data collection efforts. This tool may provide three options to automate the previous manually intensive processes. The first is connectivity with internal meeting software. For example, client personnel may tag the meetings to the deal in internal software and then those meetings may automatically appear for the user when they create the memo. If any additional deals are tagged after the fact, the user has a refresh button by which they can bring in those details ad hoc. The second option is for those have received the calendar invitations is to upload the files directly into the system, progress through a workflow in which they identify the internal business group designations, client names and titles, and which attendees should be reflected on the memo. The third is to add the meeting manually and then add the attendees manually. Through the meeting table builder, an internal database may be built of internal email address to business group designations and an external email address to client name and title. Whenever a user designates an email address to one of these components, the system remembers it and automatically displays it in the next memo. This provides an opportunity to leverage that contact data in the future.

The system can also locate regulatory documents and scrape those documents for particular, pre-defined data. The regulatory documents may public and may be located on the Internet. Once scraped and processed by the system, the memo sections requiring that information can be automatically populated. The regulatory documents scraped include recent 10-K and 10-Q filings for the selected entity. For additional information, documents can be uploaded and integrated into the memo. The system may allow for the selection of which specific sections of the documents selected are integrated.

A regulatory document scraper in the form of an API may provide exemplary embodiments with an HTML version of public filings (e.g., 10-K, 10-Q and Proxy regulatory filings) . The scraper logic can identify the beginning and end of the relevant sections. The data scarped from the document may then be used to populate various sections of the memo. The text from the scraped documents may automatically appear in the memo following processing.

Further, in exemplary embodiments, certain data feeds into the draft memo may be completely automated such that the information is scraped and integrated without user intervention once the entity for the memo is defined. This information may include market data such as stock pricing and shareholder information. For example, information on the top 30 shareholders and summaries of sell-side research and price targets, and stock price performance may be uploaded and integrated without user interface. Stock prices for a plurality of peer entities can be uploaded for comparison.

Other sections may require input and editing from the user. In these cases, the section may be selected and the section may be accessible in a word processor format (e.g., a Word document) to permit entering and editing of information into that section. The various sections may include an indicator that the section has been updated. Other sections of the memo, such as those containing the scraped and automatically collected data can also be edited by the user. Further, at any point, the entire memo can be exported and downloaded in a word processor format (e.g., a Word document).

Online edits may be provided through a Web Application Open Platform Interface Protocol (WOPI). In exemplary embodiments, that may be referred to as "the Word WOPI." This interface is the sections that are inlaid versions of word processing (e.g., Word) documents described above. This interface may provide a collaborative, online editing experience. When one user is working in a section and a second user access that section, the second user will receive a notification (e.g., a pop-up window or alert) with the name of the first user.

FIG. 1 depicts an architecture of a system 100. The architecture depicted in system 100 is meant to be exemplary and non-limiting. For example, while certain connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

The system 100 may have a user 102 that interfaces with the system through an online or web interface using HTTPS or a similar protocol. The interface may be through the core module 104 through a web application. The user 102 may interface with the system through a computing device. The computing device used to interface with the system may be of any suitable kind. For example, the computing device may be a desktop computing device or a portable (or mobile) computing device. The web application may use a Representation State Transfer (REST) API. In various embodiments, others type of web services may be used. Interface with the system 100 may be through a core module 104. For example, the user 102, through their computing device, may access an appropriate online or web address using a web browser or similar application. This interface may be with the core module 104 described below which drives the web interface and executes the applications as called by the user.

The core module 104 may include an online portion 106 that includes a word processor interface portion 108. The core module 104 may consist of one or more servers located internal to a financial institution or a similar entity. The servers may be co-located, geographically dispersed, or a combination thereof. The core module 104 may be specifically programmed to execute exemplary embodiments as described herein and perform interfacing with the necessary resources and systems as described herein. For example, the core module 104 may include or may access one or more computer processors and computer memory to execute exemplary embodiments. The core module 104 may reside across one or more servers. To execute exemplary embodiments, the core module 104 may contain programmed instructions stored on a non-transitory computer readable medium. The core module 104 may be a specifically programmed computer.

The online portion 106 may access a database 116 having both structure data sources 110 and unstructured rich text data 112. The structured data 110 may be stored on a SQL server. The unstructured rich text data 112 may be stored on a SharePoint document library. Data sources 114 may be accessed also through the online portion. The data sources 114 may be external to core module 104. The data sources may include both structured and unstructured data sources in the form of applications and/or data providers. The data sources 114 may contain data previously obtained from past uses of the system and stored for future use.

The word processor interface 108 may include a Web Application Open Platform Interface Protocol (WOPI). In exemplary embodiments, this interface may be referred to as the Word WOPI. According to exemplary embodiments, the word processing interface may be with Microsoft Word and Microsoft Office and include the associated applications and one or more viewers, including a Word viewer as depicted in FIG. 1. It should be appreciated that other word processing application and office programs may be used in addition to or in lieu of the named products.

The database 116 for storing data may include any suitable data structure to maintain the information and allow access and retrieval of the information. The database 116 may have elements 110 and 112 as described above. The database 116 may have additional elements for storing data in other formats. For example, the database may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The database 116 may be any suitable storage device or devices. The storage device(s) may be local, remote, or a combination thereof with respect to the database. The database 116 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database 116 may have back-up capability built-in. Communications with the database 116 may be over a network or communications may involve a direct connection between the database and one or more servers that are part of the online portion 106.

Figure 2A:
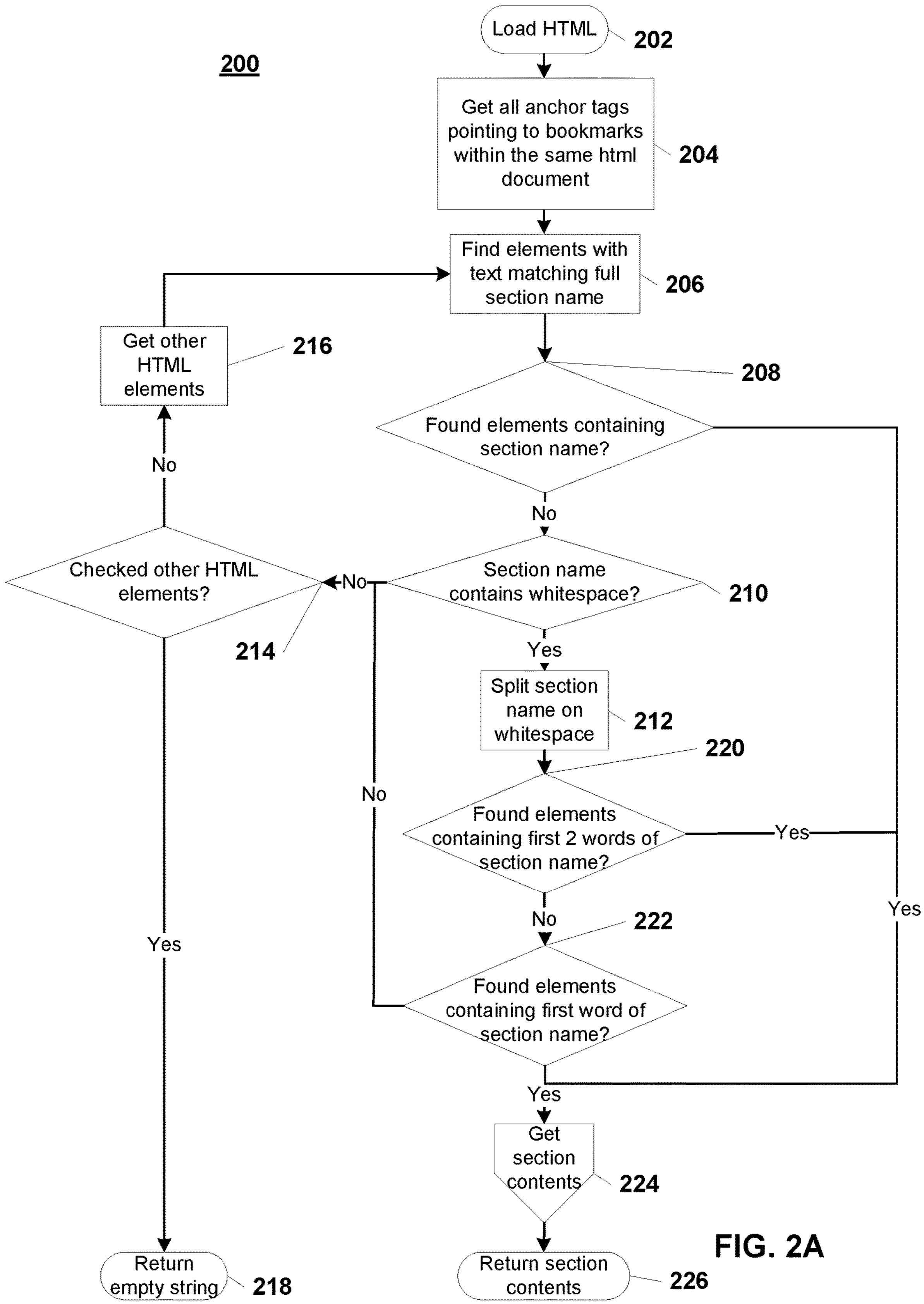
FIG. 2A depicts a method for a scraping architecture for retrieving section contents according to an exemplary embodiment.

FIG. 2A depicts a method 200 for retrieving contents of unstructured data source. This retrieval of unstructured data contents may also be referred to as scraping. The data source may be external to the system or organization and/or remotely located. The data source may be public and may be accessible over the Internet. The method begins after the data source is located (e.g., a website is accessed having the data source). The system may automatically access the data source location.

The method 200 may begin at block 202 with loading HTML format of the data.

At block 204, the anchor tags pointing to bookmarks in the document are retrieved.

At block 206, elements with text matching the section name are found. The section name may identify a section from which data is desired to be retrieved for the memo.

At block 208, if the found element contain the section name, then the method may process to block 224. At block 208, if the found element does not contain the section name, the method may proceed to block 210.

At block 210, if the section name contains whitespace, then the method may continue with block 212, otherwise, the method may continue with block 214.

At block 212, the section name is split on the whitespace.

At block 214, if other HTML elements were not checked, then the method may proceed to block 216. If the other HTML elements were checked, the method may proceed to block 218.

At block 216, other HTML elements are retrieved and the method moves back to block 206.

At block 218, an empty string is returned.

At block 220, if the found elements contain the first 2 words of the section name, then the method may proceed to block 224. If not, then the method may proceed to block 222. In various embodiments, if an exact match fails, the system may attempt partial matches before proceeding to the next step or ending the method.

At block 222, if the found elements contain the first word of the section name, then the method may proceed to block 224. If not, then the method may proceed to block 214. In various embodiments, tf an exact match fails, the system may attempt partial matches before proceeding to the next step or ending the method.

At block 224, the section contents are retrieved.

At block 226, the retrieved section contents are returned.

Figure 2B:
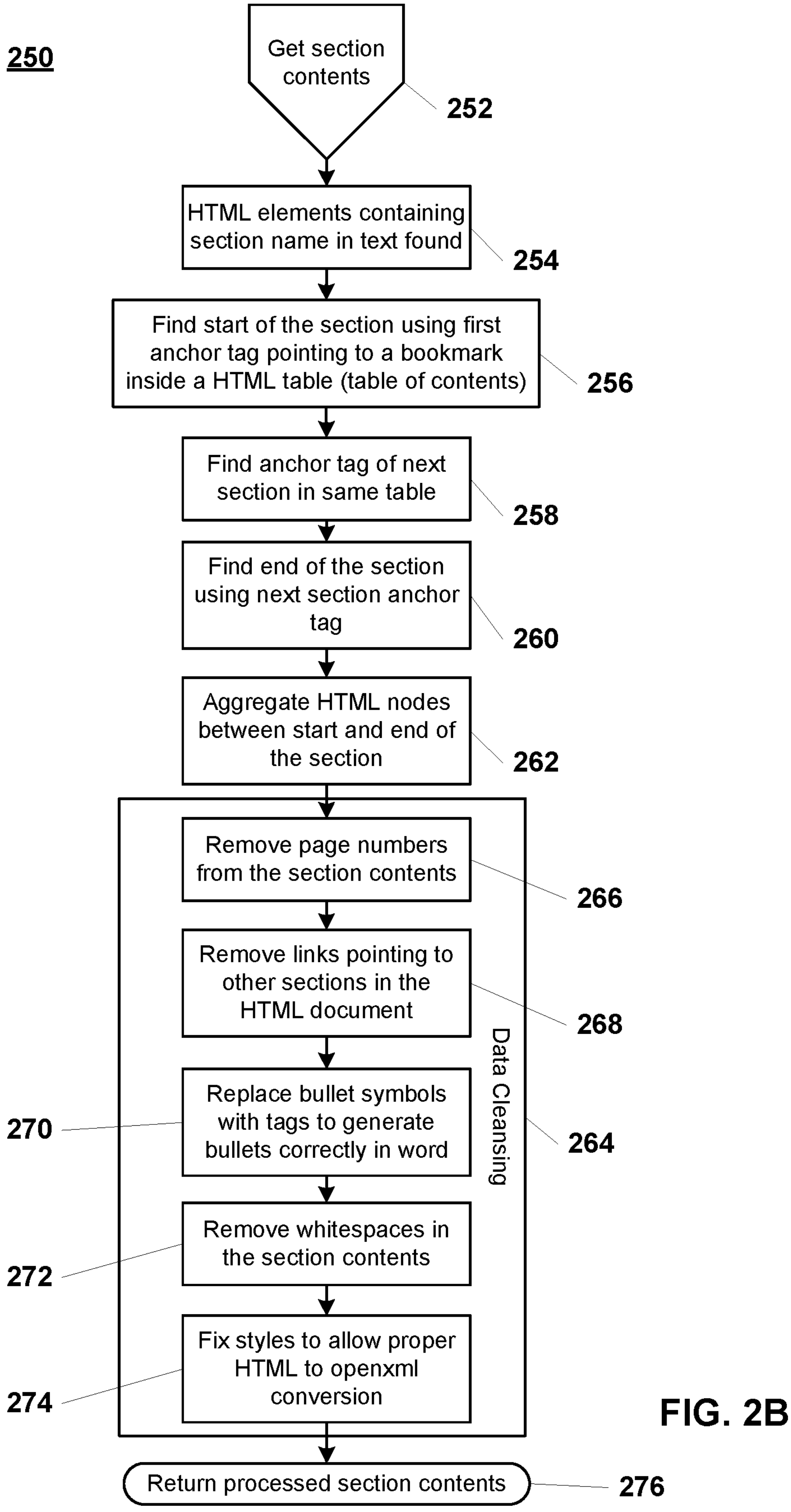
FIG. 2B depicts a continuation of the method for processing retrieved section contents according to an exemplary embodiment.

FIG. 2B depicts a method 250 for processing retrieved section contents.

The method 250 may begin with block 252 with the section contents retrieved and returned at the end of the method 200. Other section contents, already retrieved may be used in the method 250

At block 254, an HTML element containing the section name is found.

At block 256, the start of the section is found using the first anchor tag pointing to a bookmark inside of a HTML table or table of contents.

At block 258, the anchor tag of the next section in the same table is found.

At block 260, the end of the section is found using the anchor tag of the next section.

At block 262, the HTML nodes between the start and end of the section are aggregated.

Block 264 may contain steps for data cleansing beginning with block 266.

At block 266, the page numbers are removed from the section contents.

At block 268, the links pointing to other sections are removed.

At block 270, the bullet symbols are replaced with the correct tags to generate bullets correctly in the word processing program (e.g., Microsoft Word).

At block 272, any whitespaces are removed in the section contents.

At block 274, the styles in the section contents are fixed to allow for proper conversion from one format to another. For example, the conversion may be from HTML to OPENXML.

At block 276, the processed section contents are returned.

Figure 3:
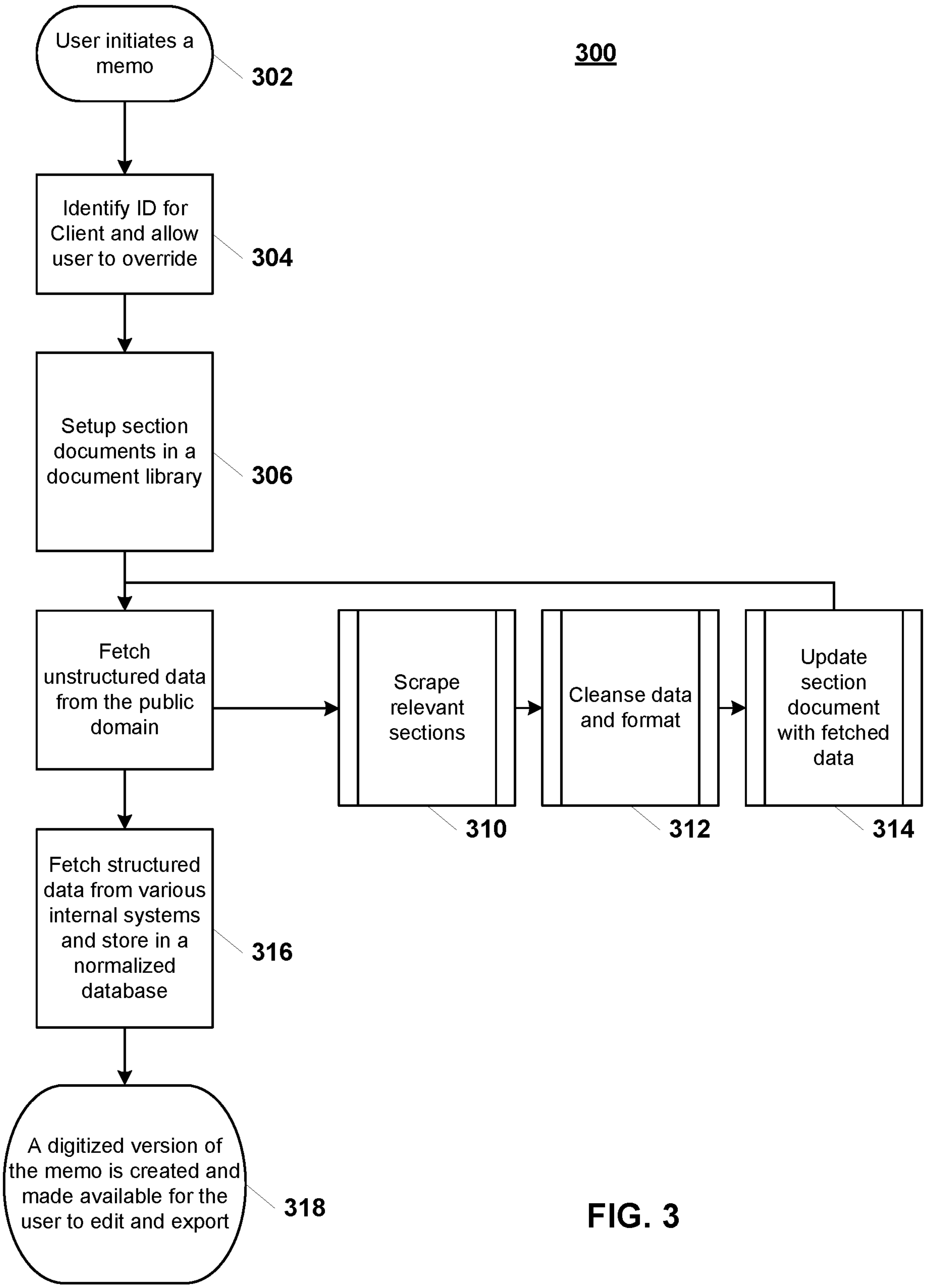
FIG. 3 depicts a method for a creation process according to an exemplary embodiment.

FIG. 3 depicts a method 300 of a memo creation process.

The method 300 may begin with block 302. At block 302, a new memo may be initiated. The new memo may be initiated through selection of an option on a dashboard as described herein.

At block 304, the subject client for the memo is identified. The client may be automatically identified by the system. In various embodiments, this identification may be overridden if it is incorrect or inaccurate.

At block 306, the section documents are set-up in a document library. The section documents may be set-up based on the attributes underlying the memo's focus. The section documents may represent each section of the memo.

For example, each section may be configured as a separate document. These section documents may then be assembled into the memo upon completion of the method 300. In other embodiments, the memo may be configured as a single document with multiple sections. Each section may have a set of supporting data and documents that are set-up in the document library.

At block 308, unstructured public data may be fetched from the public domain. For example, data from the SEC may be fetched.

At block 310, relevant sections from the public data are scraped.

At block 312, the scraped data is cleansed and formatted.

At block 314, the section document is updated with the fetched data.

At block 316, structured data from various internal sections is fetched and stored in a normalized database.

At block 318, a digitized version of the memo is created from the section documents. This digitized version may be available for edit and export.

Figure 4:
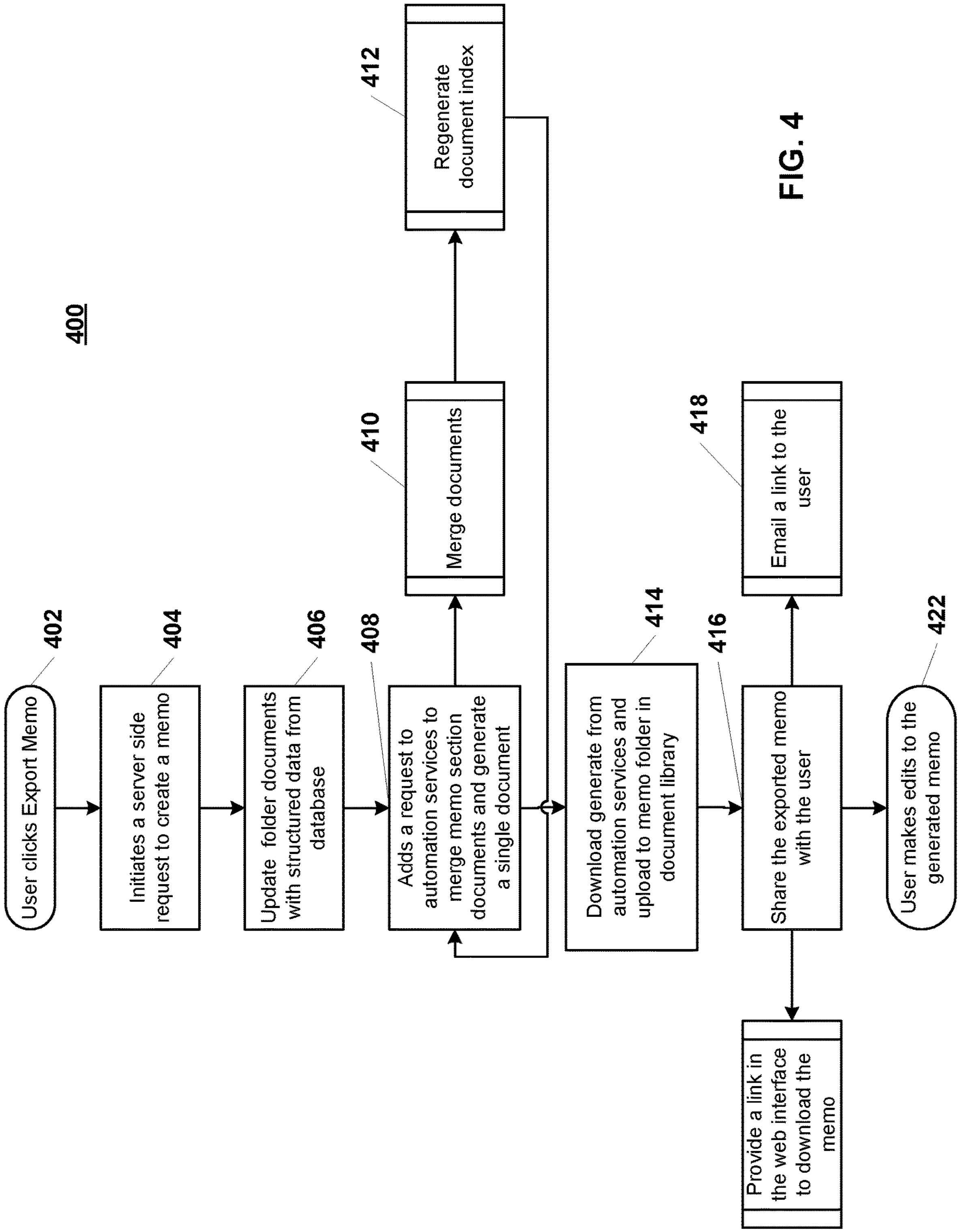
FIG. 4 depicts a method for an export process according to an exemplary embodiment.

FIG. 4 depicts a method 400 of an export process for a memo.

The method 400 may begin with block 402. At block 402, the user may click “Export Memo” (or a similar button or menu item) from within the program, such as from the dashboard. This step may be performed following the method 300.

At block 404, a server side request is initiated to create the memo.

At block 406, folder documents are updated with structured data from the database.

At block 408, a request is added to automation services to merge memo section documents and generate a single document (e.g., a Word document).

At block 410, documents are merged.

At block 412, document index is regenerated.

At block 414, a download is generated from the automation services and uploaded to the memo folder in the document library.

At block 416, the exported memo is shared with the user.

At block 418, a link is emailed to the user. The link is to the download generated at block 414.

At block 420, a link is provided in the web interface to download the memo.

At block 422, the user may make edits to the generated memo. This step may be optional.

Figure 5:
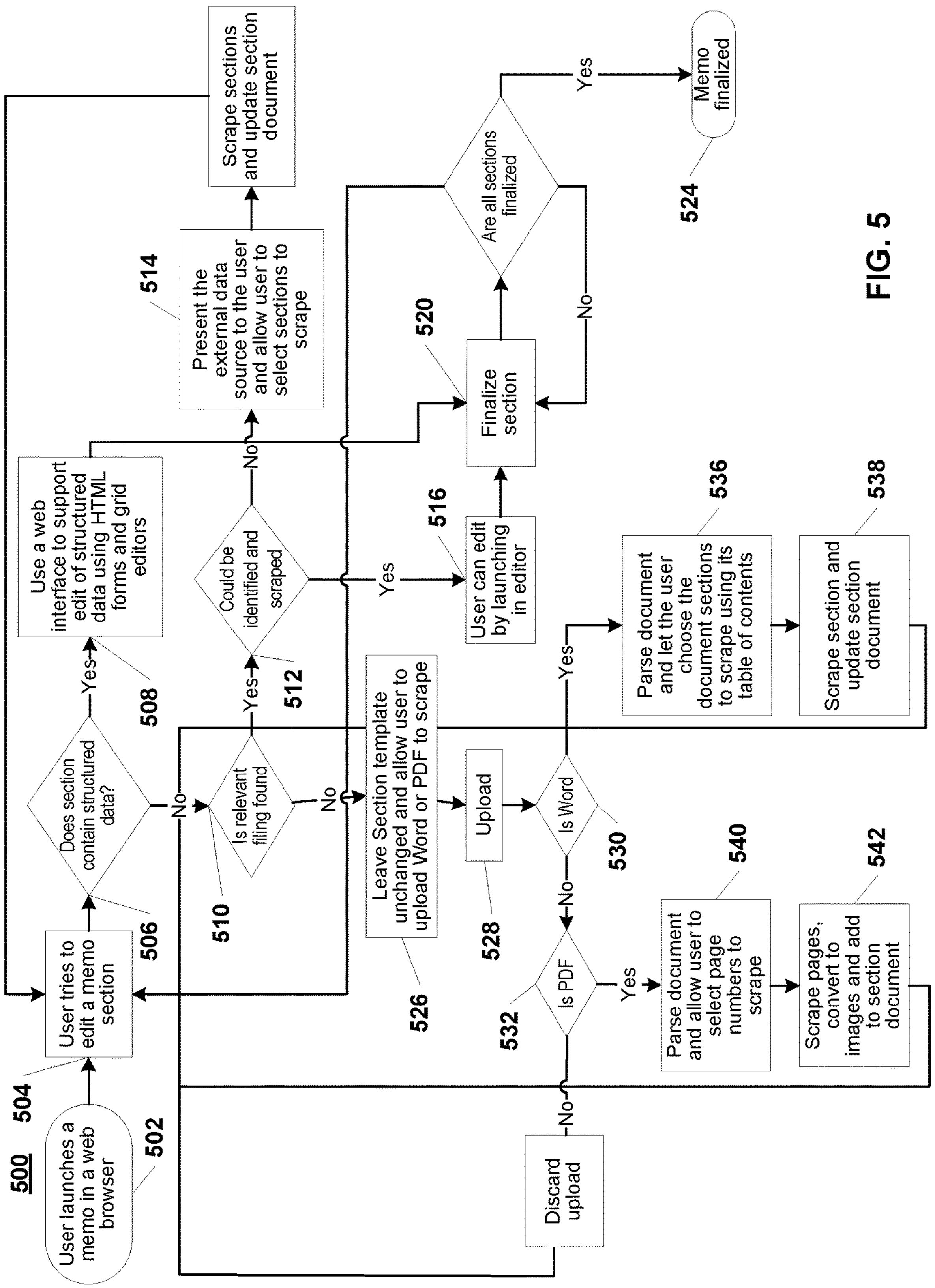
FIG. 5 depicts a method for editing a memo or a portion of a memo according to an exemplary embodiment.

FIG. 5 depicts a method 500 for editing a memo or a portion of the memo. The memo may be created as described herein within the system according to exemplary embodiments.

The method 500 may begin with block 502. A user may launch a memo in a web browser from the system according to exemplary embodiments. In various embodiments, the memo may be one generated and exported using the method 400. In other embodiments, the memo may not have been exported. The memo may be accessed through a dashboard as described herein.

At block 504, the user may select to edit a memo section.

At block 506, if the section contains structured data, the method 500 may continue with block 508. If not, the method may continue with block 510.

At block 508, a web interface is presented to be used to support the editing of structured data using HTML forms and grid editors.

At block 510, if a relevant filing is found, the method 500 may continue with block 512. If not, the method may continue with block 526.

At block 512, if the relevant filing from block 510 can be identified and scraped, then the method 500 may continue with block 516. If not, the method may continue with block 514.

At block 514, the external data source is presented to the user and the user may select the sections to scrape.

At block 516, the user may edit the memo by launching a word processor, such as Word.

At block 518, the sections are scraped and the section document is updated.

At block 520, a section is finalized.

At block 522, if all sections are finalized, then the method 500 may proceed to block 524. If not, the method may proceed back with block 520. It should be appreciated, the method may also return to any necessary step to finalize the section.

At block 524, the memo is finalized.

At block 526, the section template is left unchanged and the user may upload a Word or PDF document to scrape. It should be appreciated that the Word and PDF formats are exemplary only and other similar and suitable formats may be used.

At block 528, an upload is performed.

At block 530, if the upload is a Word document (or other word processing format) than the method 500 may continue with block 536. If not, the method may proceed with block 532.

At block 532, if the upload is a PDF document (or other similar format), then the method 500 may continue with block 540. If not, the method may proceed with block 534.

At block 534, the upload is discarded.

At block 536, the document is parsed and the user may choose the document section to scrape using the table of contents.

At block 538, the section is scraped and the section document is updated.

At block 540, the document is parsed and the user may select the page numbers to scrape.

At block 542, the pages are scraped, converted to images, and added to section document.

Figure 6:
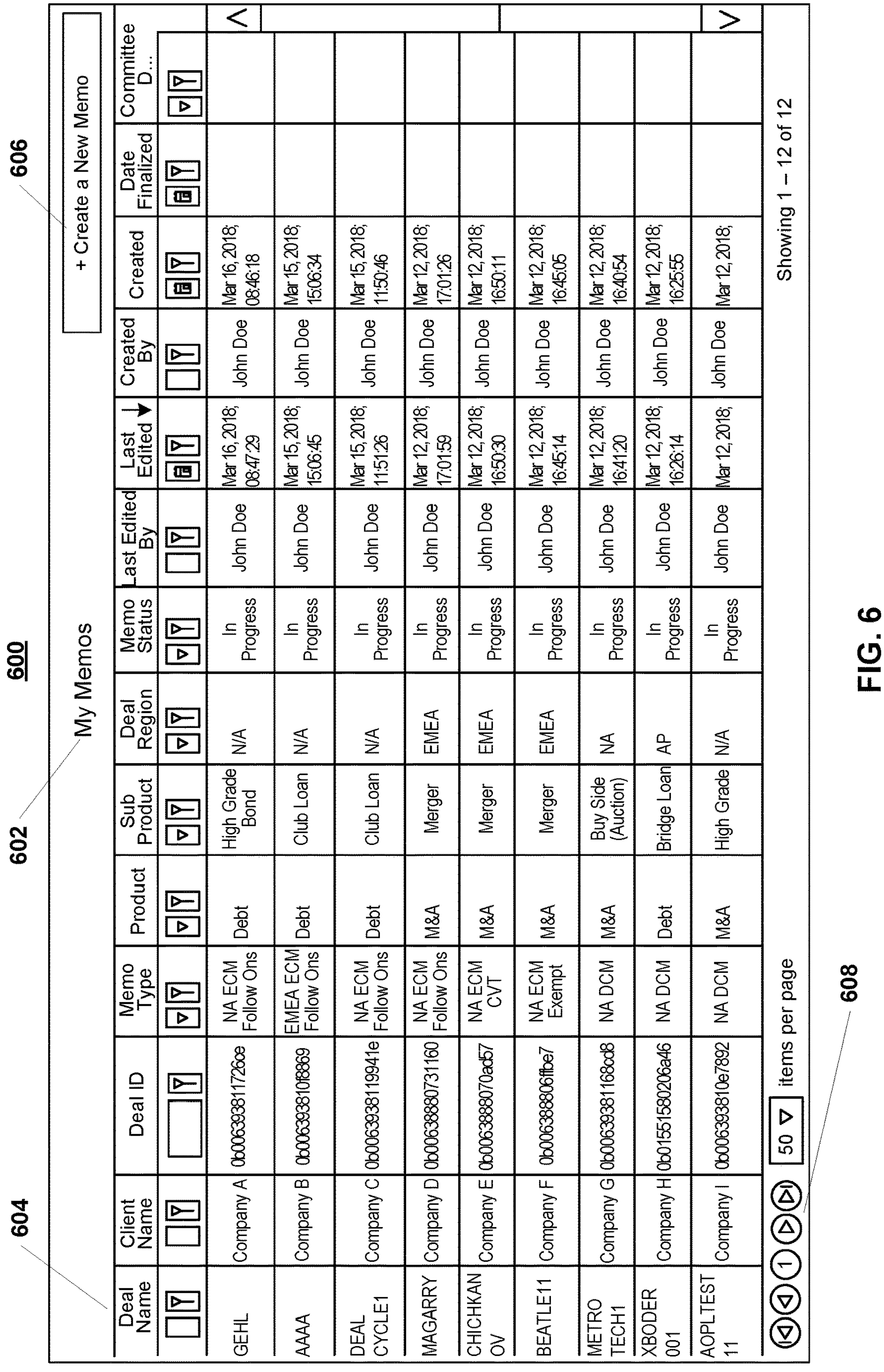
FIG. 6 depicts a memo dashboard according to an exemplary embodiment.

FIG. 6 depicts a memo dashboard 600 according to an exemplary embodiment. The dashboard 600 may provide a listing 602 of all memos for a particular user or associated with a particular deal or due diligence effort. At 604 a status bar may provide various details about each memo listed, including, but not limited to the deal name, the client name, the deal ID, the memo type, the product, the sub-product, the deal region, the memo status, last edited information include person and date, memo creation information include person and date, the date finalized, and the committee for which the memo was for. Each of these fields may be customizable in that the field can be moved to a different position, the field may be removed from the dashboard, and other fields may be added.

The dashboard 600 has a button 602 to create a new memo. Upon selection of the button 606, the interface 700 (as depicted in FIG. 7) may appear.

At 608, additional pages of memos may be viewed.

Figure 7:
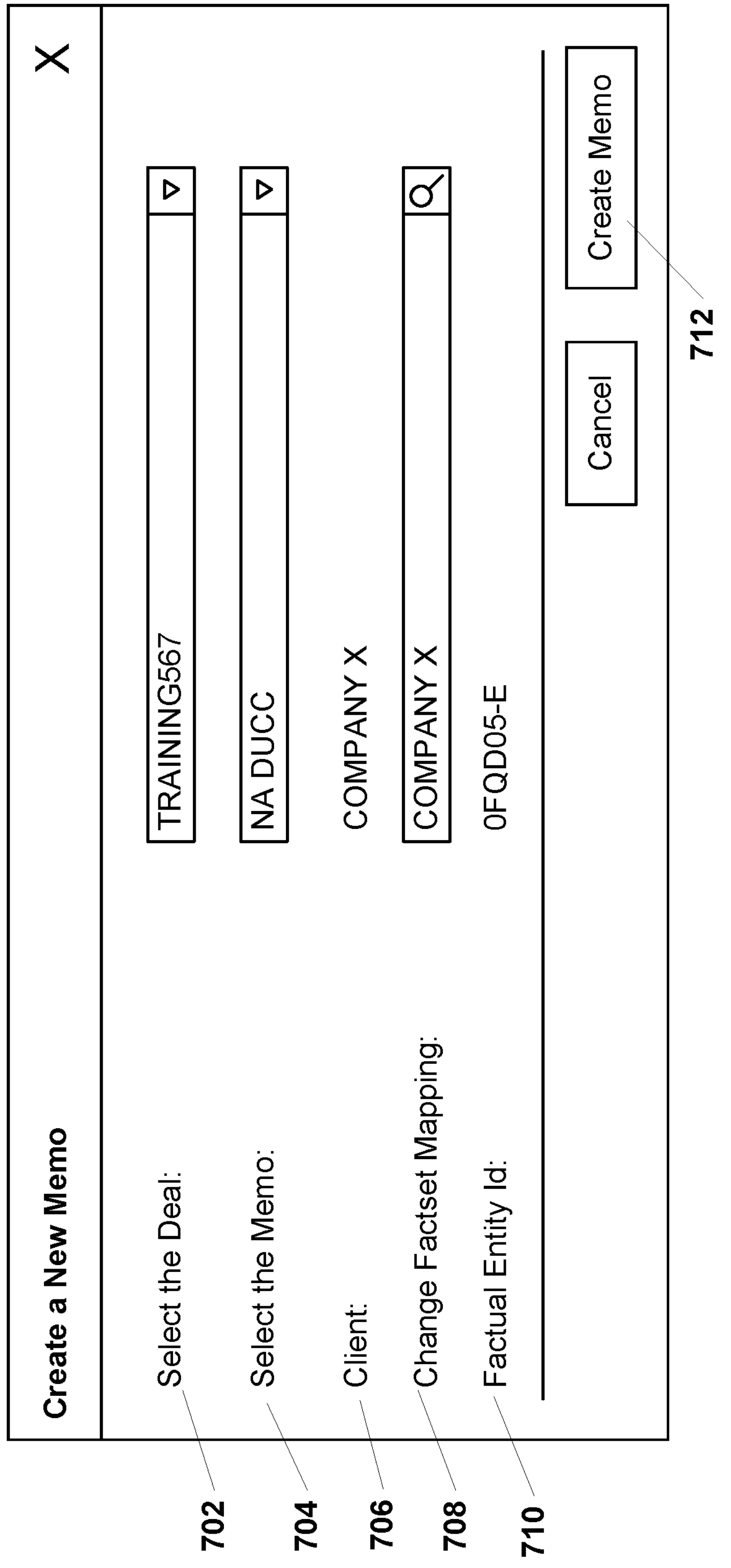
FIG. 7 depicts an interface for creating a new memo according to an exemplary embodiment.
Figure 8:
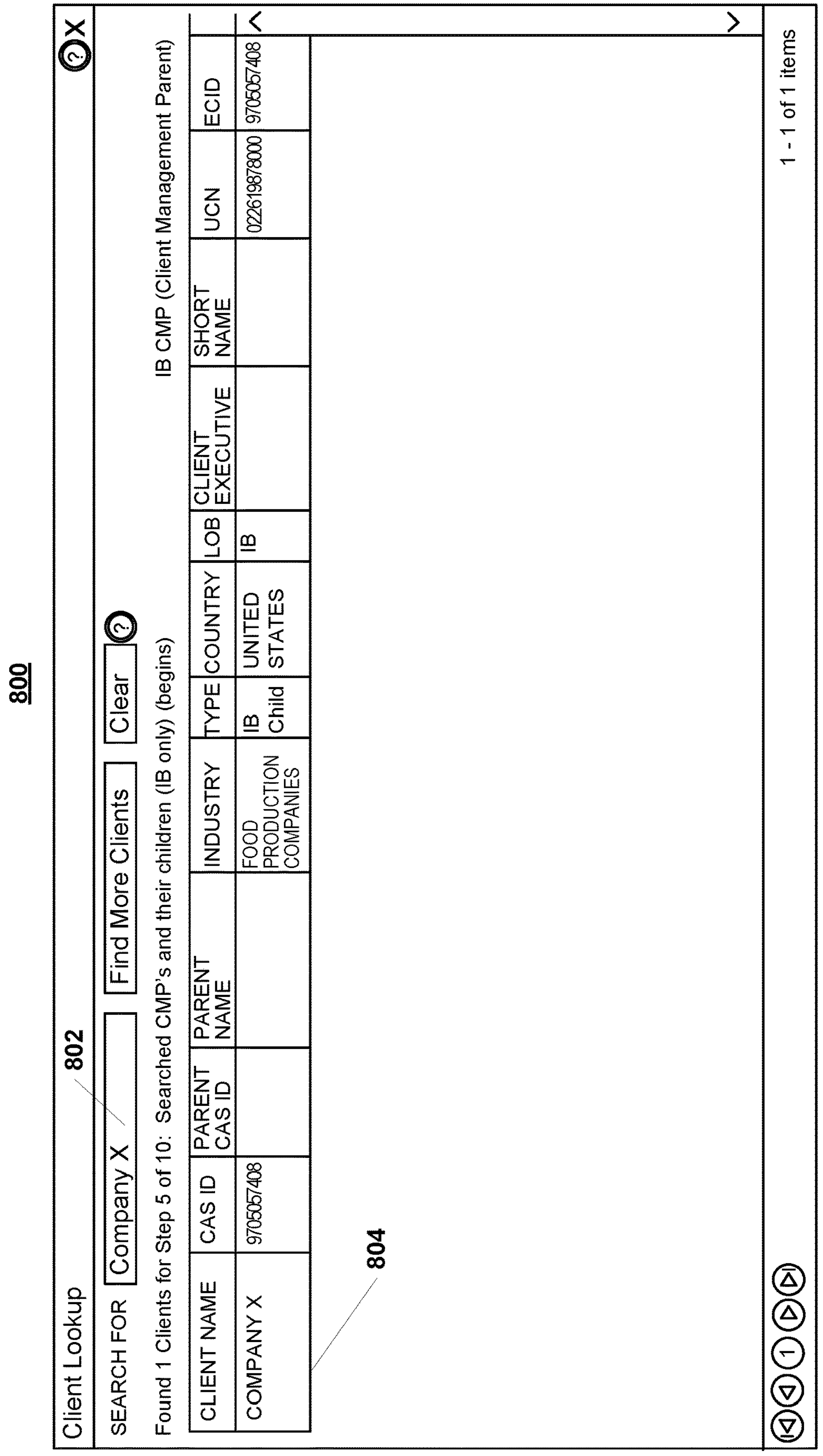
FIG. 8 depicts an interface for searching for client according to an exemplary embodiment.

FIG. 7 depicts an interface 700 for creating a memo according to an exemplary embodiment. The interface 700 may be entitled “Create a New Memo” as shown and may appear follow selection of the button 606 of FIG. 6. The interface 700 may appear as a pop-up window overlaid on the dashboard 600. The interface 700 may provide for selection of various options to enable the creation of a template for a new memo. Through selection of the various options, the new memo template is created and may be prepopulated with information from a variety of sources based on the selection. These sources include data sources as well as previous memos that have been created on the same client or company. At 702, the appropriate deal may be selected. At 704, the type of memo may be selected. There may be a plurality of memo types to select from, with each memo type being for a different purpose. The memo types may be predetermined by the organization. At 706, the client may be identified. This identification may be indicated based on the deal selection. At 708, the mapping for use with a data integration program may be provided. Exemplary embodiments may use FactSet as an integrated financial and software solution provider. It should be appreciated that this is exemplary and non-limiting. The mapping may indicate and control the data sources where information is pulled from relating to the indicated client. According to exemplary embodiments, this mapping may control the automation of the external data feeds that are accessed. At 710, the factual entity identification (ID) may be indicated based on the selection at 708. For example, this ID may be associated with FactSet to retrieve the associated information. Clicking on the box at 708 may bring up a search interface 800 (as depicted in FIG. 8). Once all the appropriate options are selected, the create new memo button 712 may be selected. Once this button is selected, a new memo template may be created.

FIG. 8 an interface 800 for searching for client according to an exemplary embodiment. The search interface 800 may enable searching for a client at 802, to ensure that the correct entity or company is selected to be associated with the memo. Information on the client may be retrieved at 804 to the extent such information exists. In exemplary embodiments, the search may be powered by an internal service. For example, the client information may be searched and retrieved from internal databases and/or sources. In various embodiments, an external service may be used in conjunction with and/or in place of the internal service. For example, the information may be retrieved from FactSet or a similar external service or the external service results may supplement results returned form the internal service. Once returned, various information may be shown as depicted in the search results 804.

FIG. 9A depicts a menu 900 of memo sections according to an exemplary embodiment. The menu 900 may be created once the new memo button 712 is selected in the interface 700 of FIG. 7. The menu 900 may list the various sections of the memo. This listing of sections may change based on the memo type selected. Each entry on the memo 900 may be selectable. That is, each entry can be clicked upon to actuate opening of a window that contains that particular section of the memo. For example, the section 5 (Issuer Financials) at 902 may be clicked on. The section may open up in a new window. The menu 900 may remain on the screen and be accessible during opening of each new window. For example, the menu 900 may be anchored on the left side of the screen and the selected section may open on the right side of the screen according to exemplary embodiments. According to exemplary embodiments, data from previous memos on the particular client may be automatically populated into the appropriate sections.

FIG. 9B depicts a menu 950 of memo sections according to an exemplary embodiment. Menu 950 may be an example of the sections for a different memo type. As can be seen, the menu 950 contains different sections than those listed in the menu 900. The menu 950 may behave in similar manner to that of the menu 900 as described above with respect to FIG. 9A. For example, the section 5 "Business Description" at 952 may be clicked on or selected causing a window as depicted in FIG. 10A to appear.

Figure 10A:
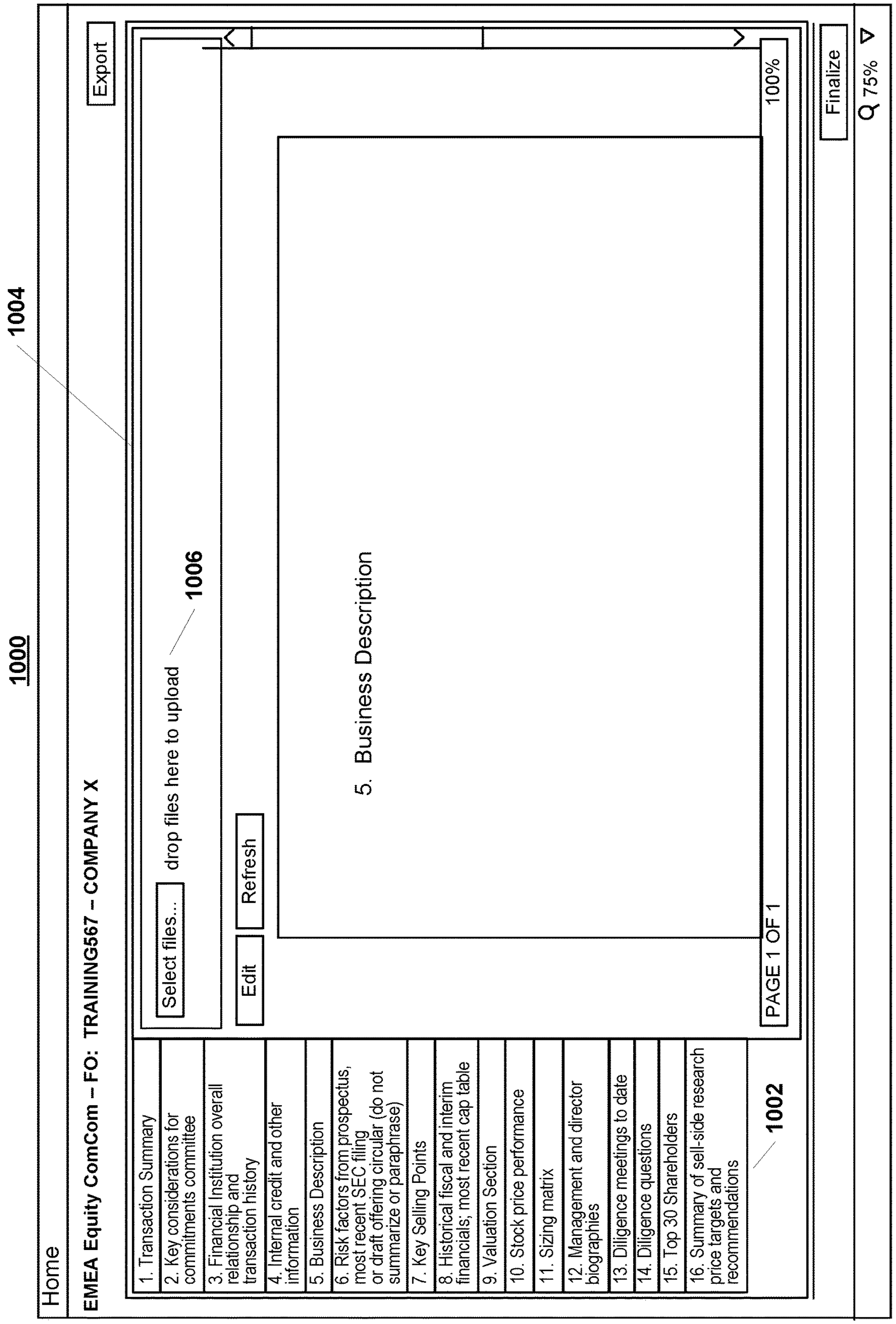
FIG. 10A depicts a screen for editing a portion of a memo according to an exemplary embodiment.

FIG. 10A depicts a screen 1000 for editing a portion of a memo according to an exemplary embodiment. The screen 1000 depicts an example of a section selected from the menu. The section menu 1002 may be located on the left side of the screen and the selected section 1004 may be open on the right side of the screen. In the example depicted in this Figure, section 5 has been selected ("Business Description"). In various embodiments, this section (5) may automatically be populated with data from public data sources for certain entities. For example, data from public 10-K and 10-Q filings may be automatically populated for public companies. This section may also enable the upload of filings at 1006 containing information on the desired entity. These may be files from which data cannot automatically be obtained. For example, these documents may include Europe, Middle East and Africa (EMEA) and Asia-Pacific (APAC) documents.

FIG. 10B depicts an interface 1050 for selecting portions of a file to import according to an exemplary embodiment. Once a document for upload has been identified as described in FIG. 10A, the sections to import may be identified at 1052. This listing of sections may be generated from a table of contents associated with the document. For example, one section may be desired to be imported as shown. Once that section is identified at 1052, the section may be imported at 1054. It should be appreciated that more than one section can be selected. Further, the entire document can be imported at 1056.

Figure 11:
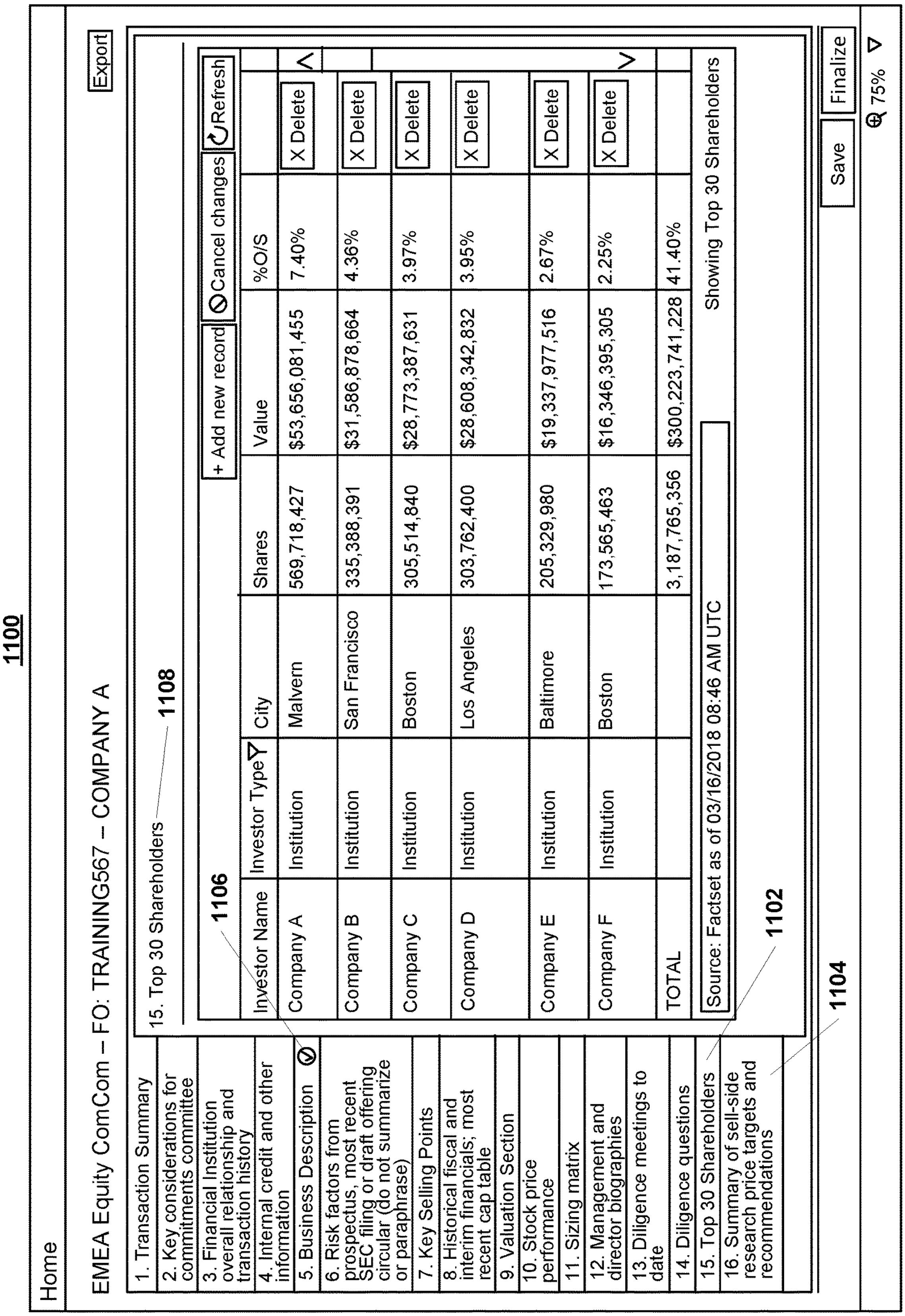
FIG. 11 depicts a data screen for a memo according to an exemplary embodiment.

FIG. 11 depicts a data screen 1100 for a memo according to an exemplary embodiment. The data screen 1100 may depict a section that is automatically populated with data from one or more data sources. According to exemplary embodiments, sections 15 ("Top 30 Shareholders") 16 ("Summary of sell-side research price targets and recommendations") may be populated and generated in this manner (labeled as 1102 and 1104). FIG. 11 also depicts, at 1106, an example indication that section has been completed. In this example, a check mark appears next to section 5 indicated that the section has been completed or populated. Further, in this example, an exemplary display of section 15 is shown at 1108.

FIG. 12 depicts an event table 1200 according to an exemplary embodiment. This table may be shown by selecting section 13 ("Diligence meetings to date") at 1202. Upon selection of that section, calendar information at 1204 may appear that documents the past meetings related to the particular deal. These may be populated automatically based on meetings documented already relating to the deal or associated with a previous deal for that client. Additionally, meeting files can be imported. For example, calendar items from Outlook can be uploaded. The information display for each meeting may include the date, the event name, the attendees and titles, and other attendees. An option to edit each entry at 1206 may be provided.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

The foregoing examples show the various embodiments in exemplary configurations; however, it should be appreciated that the various components may be configured in a variety of way. Further, it should be appreciated that the components of the various embodiments may be combined into one or more devices, collocated on a particular node of a distributed network, or distributed at various locations in a network, including being geographically separated, for example. As will be appreciated by those skilled in the art, the components of the various embodiments may be arranged at any location or locations within a distributed network without affecting the operation of the respective system.

As described above, the various embodiments of the present invention support a number of devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, application, or software.

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its exemplary embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

Although the embodiments have been described herein in the context of a particular implementation in a particular environment for a particular purpose, those skilled in the art will recognize that its usefulness is not limited thereto and that the embodiments can be beneficially implemented in other related environments for similar purposes.

What is claimed is:

1. A system, comprising:
- a memory device;
- a processor communicatively coupled to the memory device and executing instructions comprising:
  - receiving an input for creation of a new memo such that the input comprises a memo type and a target entity;
  - creating a new memo template based on the input for creation of the new memo wherein the new memo has a plurality of sections;
  - accessing one or more unstructured data sources;
  - retrieving data from the one or more unstructured data sources the retrieving comprising:
    - retrieving HTML format of the data of the unstructured data source;
    - retrieving anchor tags pointing to bookmarks in the data;
    - finding elements with text matching a section name, wherein the section name comprises a section from which data is desired to be retrieved;
    - upon not finding an element containing the section name, checking for the element containing at least one word of the section name; and
    - retrieving the section contents upon finding one or more elements with text matching the section name either in full or at least one word of the section name:
  - formatting the data retrieved from the one or more unstructured data sources;
  - inserting the formatted data into one or more section of the new memo;
  - retrieving data from one or more structured data sources;
  - inserting the data from the one or more structured data sources;
  - receiving a selection of a section from the plurality of sections;
  - providing access to a word processing interface to edit the selection of the section, wherein providing access comprises opening the selection in a separate window comprising a word processing application and receiving the selection from the word processing application upon completion of editing of the selection;
  - retrieving data from one or more sources and populate one or more sections of the plurality of sections; and
  - importing meeting information into at least one section of the plurality of sections.

2. The system of claim 1, wherein the one or more unstructured data sources comprise external data sources.

3. The system of claim 2, wherein the external data sources comprise public data sources on the Internet.

4. The system of claim 1, wherein the one or more unstructured data sources comprise SEC filings.

5. The system of claim 1, wherein the one or more structured data sources comprise at least one of internal data sources and external data sources.

6. The system of claim 1, wherein the one or more sources comprise one or more of stock and shareholder information.

7. The system of claim 1, the instructions further comprising:
- exporting a formatted version of the new memo in a designated format.

8. The system of claim 1, the instructions further comprising:
- importing calendar information from a mail management program.

9. The system of claim 1, the instructions further comprising:
- importing data from a previously created memo, wherein the imported data comprises data relating to the target entity of the new memo.

10. The system of claim 1, wherein the instruction to format data from the one or more unstructured data sources comprises:
- locating an HTML element containing a section name;
- finding a start of a section corresponding to the section name by locating a first anchor tag pointing to a bookmark inside of a HTML table or table of contents;
- finding a second anchor tag of the next section wherein the second anchor is used to indicate the end of the section;
- aggregating the start and the end of the section;
- removing page numbers, whitespace, and links to other sections from the section;

replacing any bullet symbols with the correct tags to generate bullets correctly in the word processing program; and correcting any styles in the section contents to allow for HTML to OPENXML conversion.

11. The system of claim 1, the instructions further comprising:

receiving an uploaded file containing data in one or more defined sections;

providing an interface configured to allow for the selection of one or more of the one of more defined sections; and uploading data from the selection into the new memo into at least one of the plurality of sections.

12. The system of claim 1, the instructions further comprising:

presenting a dashboard comprising a listing of previous memos.

13. The system of claim 1, the instructions further comprising:

providing an indicator of completion of each section of the plurality of sections once each section has been accessed and data input thereto.

* * * * *